United States Patent
Tolley et al.

(10) Patent No.: US 10,681,904 B2
(45) Date of Patent: *Jun. 16, 2020

(54) TECHNIQUES FOR MAINTAINING PALATABILITY OF A BAIT MATERIAL IN A PEST CONTROL DEVICE

(71) Applicant: Dow AgroSciences LLC, Zionsville, IN (US)

(72) Inventors: Mike P. Tolley, Indianapolis, IN (US); Phillip J. Howard, Zionsville, IN (US); Joseph J. DeMark, Westfield, IN (US); Donald E. Wiliams, III, Greenfield, IN (US)

(73) Assignee: Dow AgroSciences LLC, Zionsville, IN (US)

( * ) Notice: Subject to any disclaimer, the term of this patent is extended or adjusted under 35 U.S.C. 154(b) by 476 days.

This patent is subject to a terminal disclaimer.

(21) Appl. No.: 15/438,871

(22) Filed: Feb. 22, 2017

(65) Prior Publication Data

US 2017/0223945 A1   Aug. 10, 2017

Related U.S. Application Data

(60) Division of application No. 14/485,113, filed on Sep. 12, 2014, now Pat. No. 9,655,354, which is a division
(Continued)

(51) Int. Cl.
| | | |
|---|---|---|
| *A01M 1/02* | (2006.01) | |
| *A01M 1/20* | (2006.01) | |
| *A01M 17/00* | (2006.01) | |

(52) U.S. Cl.
CPC ............ *A01M 1/2011* (2013.01); *A01M 1/02* (2013.01); *A01M 1/026* (2013.01); *A01M 1/20* (2013.01);
(Continued)

(58) Field of Classification Search
CPC .......... A01M 1/00; A01M 1/02; A01M 1/026; A01M 1/20; A01M 1/2005; A01M 1/2011; A01M 17/00
(Continued)

(56) References Cited

U.S. PATENT DOCUMENTS

| | | | | |
|---|---|---|---|---|
| 2,080,138 A | * | 5/1937 | Krebs | .................... C12H 1/003 |
| | | | | 426/12 |
| 2,114,009 A | * | 4/1938 | Ramsay | ................... C12G 3/07 |
| | | | | 99/277.1 |

(Continued)

FOREIGN PATENT DOCUMENTS

| | | |
|---|---|---|
| EP | 0 283 142 A1 | 9/1988 |
| EP | 1563730 | 8/2005 |

(Continued)

OTHER PUBLICATIONS

European Search Report prepared for EP 04078064, dated Feb. 16, 2005.
(Continued)

*Primary Examiner* — Darren W Ark
(74) *Attorney, Agent, or Firm* — Barnes & Thornburg LLP

(57) ABSTRACT

A termite control bait container includes an upper end portion opposite a lower end portion. The bait container includes a chamber containing a termite bait. The lower end portion includes an air-trapping pocket below at least a portion of the bait to reduce intrusion of water through the lower end portion when installed in a selected orientation at least partially below ground.

12 Claims, 17 Drawing Sheets

Related U.S. Application Data of application No. 13/462,866, filed on May 3, 2012, now Pat. No. 8,832,994, which is a continuation of application No. 12/220,458, filed on Jul. 24, 2008, now Pat. No. 8,196,342.

(60) Provisional application No. 60/962,024, filed on Jul. 26, 2007.

(52) U.S. Cl.
CPC .......... *A01M 1/2005* (2013.01); *A01M 17/00* (2013.01); *A01M 2200/011* (2013.01)

(58) Field of Classification Search
USPC ........................................ 43/132.1, 131, 124
See application file for complete search history.

(56) References Cited

U.S. PATENT DOCUMENTS

| | | | | |
|---|---|---|---|---|
| 2,157,953 A * | 5/1939 | De Long | ............ | A01M 1/2005 43/131 |
| 2,203,229 A * | 6/1940 | Nilsson | ............ | C12G 3/07 99/277.1 |
| 3,942,423 A * | 3/1976 | Herzfeld | ............ | C12G 3/07 99/277.1 |
| 4,991,439 A * | 2/1991 | Betts | ............ | A01M 1/026 73/587 |
| 4,998,643 A * | 3/1991 | Pradel | ............ | B65D 45/32 220/320 |
| 5,329,726 A * | 7/1994 | Thorne | ............ | A01M 1/026 43/124 |
| 5,537,913 A * | 7/1996 | Vowles | ............ | C12G 1/02 426/11 |
| 5,564,222 A | 10/1996 | Brody | | |
| 5,571,967 A * | 11/1996 | Tanaka | ............ | G01N 3/42 340/573.2 |
| 5,575,105 A | 11/1996 | Otomo | | |
| 5,592,774 A * | 1/1997 | Galyon | ............ | A01M 1/026 43/124 |
| 5,647,268 A * | 7/1997 | Sullivan | ............ | C12G 3/07 99/277.1 |
| 5,815,090 A * | 9/1998 | Su | ............ | A01M 1/026 340/870.16 |
| 5,832,658 A * | 11/1998 | Randon | ............ | A01M 1/026 43/131 |
| 5,877,422 A * | 3/1999 | Otomo | ............ | A01M 1/026 73/587 |
| 5,899,018 A * | 5/1999 | Gordon | ............ | A01M 1/026 43/131 |
| 5,921,018 A * | 7/1999 | Hirose | ............ | A01M 1/026 43/131 |
| 5,950,356 A * | 9/1999 | Nimocks | ............ | A01M 1/026 43/131 |
| 5,953,855 A * | 9/1999 | Edwards | ............ | A01M 1/026 43/132.1 |
| 5,974,726 A | 11/1999 | Creeger et al. | | |
| 6,016,625 A * | 1/2000 | Bishoff | ............ | A01M 1/026 43/107 |
| 6,023,879 A * | 2/2000 | Katz | ............ | A01M 1/026 43/124 |
| 6,058,646 A * | 5/2000 | Bishoff | ............ | A01M 1/026 220/3.7 |
| 6,079,151 A * | 6/2000 | Bishoff | ............ | A01M 1/026 43/131 |
| 6,100,805 A * | 8/2000 | Lake | ............ | A01M 1/026 340/540 |
| 6,150,944 A * | 11/2000 | Martin | ............ | A01M 1/026 340/573.1 |
| 6,178,834 B1 * | 1/2001 | Cates | ............ | A01M 1/026 43/132.1 |
| 6,187,328 B1 | 2/2001 | Ballard et al. | | |
| 6,243,014 B1 * | 6/2001 | Lake | ............ | A01M 1/026 340/541 |
| 6,255,959 B1 * | 7/2001 | Lake | ............ | A01M 1/026 29/825 |
| 6,281,799 B1 * | 8/2001 | Lake | ............ | A01M 1/026 340/573.1 |
| 6,304,185 B1 * | 10/2001 | Tuttle | ............ | A01M 1/026 340/10.1 |
| 6,313,748 B1 * | 11/2001 | Lake | ............ | A01M 1/026 340/572.1 |
| 6,323,772 B1 * | 11/2001 | Lake | ............ | A01M 1/026 340/573.1 |
| 6,370,812 B1 * | 4/2002 | Burns | ............ | A01M 1/026 43/124 |
| 6,373,391 B1 * | 4/2002 | Lake | ............ | A01M 1/026 340/573.1 |
| 6,392,545 B2 * | 5/2002 | Lake | ............ | A01M 1/026 174/254 |
| 6,397,516 B1 * | 6/2002 | Su | ............ | A01M 1/026 43/124 |
| 6,404,210 B1 * | 6/2002 | Su | ............ | A01M 1/026 324/692 |
| 6,515,591 B2 * | 2/2003 | Lake | ............ | A01M 1/026 340/573.1 |
| 6,543,182 B2 * | 4/2003 | Snell | ............ | A01M 1/026 43/132.1 |
| 6,581,325 B2 | 6/2003 | Gordon | | |
| 6,681,518 B2 | 1/2004 | Aesch, Jr. et al. | | |
| 6,724,312 B1 * | 4/2004 | Barber | ............ | A01M 1/026 29/825 |
| 6,729,067 B2 * | 5/2004 | Lund | ............ | A01M 1/026 43/124 |
| 6,772,557 B2 * | 8/2004 | Laskey | ............ | A01M 1/026 43/124 |
| 6,857,223 B2 * | 2/2005 | Su | ............ | A01M 1/2005 43/131 |
| 6,914,529 B2 * | 7/2005 | Barber | ............ | A01M 1/026 340/573.2 |
| 6,990,769 B2 * | 1/2006 | Wright | ............ | A01M 1/026 43/131 |
| 7,086,196 B2 * | 8/2006 | Cink | ............ | A01M 1/026 43/132.1 |
| 7,212,112 B2 * | 5/2007 | Barber | ............ | A01M 1/026 340/539.2 |
| 7,212,129 B2 * | 5/2007 | Barber | ............ | A01M 1/026 29/825 |
| 7,233,251 B2 * | 6/2007 | Lewis | ............ | A01M 1/026 340/556 |
| 7,262,702 B2 * | 8/2007 | Barber | ............ | A01M 1/026 340/572.1 |
| 7,348,890 B2 * | 3/2008 | Barber | ............ | A01M 1/026 340/539.26 |
| 7,497,047 B1 * | 3/2009 | Aesch, Jr. | ............ | A01M 1/026 43/132.1 |
| RE40,884 E * | 9/2009 | Masterson | ............ | A01M 1/026 116/208 |
| 7,671,750 B2 * | 3/2010 | Tolley | ............ | A01M 1/026 340/539.26 |
| 7,719,429 B2 * | 5/2010 | Barber | ............ | A01M 1/026 340/321 |
| 7,823,323 B2 * | 11/2010 | Su | ............ | A01M 1/026 43/131 |
| 7,874,099 B2 * | 1/2011 | Cink | ............ | A01M 1/026 43/131 |
| 7,987,629 B2 * | 8/2011 | Harper | ............ | A01M 25/004 220/525 |
| 7,987,630 B2 * | 8/2011 | Cink | ............ | A01M 1/2011 43/132.1 |
| 8,196,342 B2 * | 6/2012 | Tolley | ............ | A01M 1/026 43/132.1 |
| 8,215,052 B2 * | 7/2012 | Cink | ............ | A01M 1/2011 43/132.1 |
| 8,322,069 B2 * | 12/2012 | Cink | ............ | A01M 1/026 43/121 |
| 8,832,994 B2 * | 9/2014 | Tolley | ............ | A01M 1/026 43/132.1 |

(56) References Cited

U.S. PATENT DOCUMENTS

| | | | |
|---|---|---|---|
| 9,258,991 B2 * | 2/2016 | Harper | A01M 25/004 |
| 9,655,354 B2 * | 5/2017 | Tolley | A01M 1/026 |
| 9,693,546 B2 * | 7/2017 | Matsuura | A01M 1/026 |
| 9,723,829 B2 * | 8/2017 | Azzarello | A01M 1/026 |
| 10,178,858 B2 * | 1/2019 | Azzarello | A01M 1/026 |
| 10,448,627 B2 * | 10/2019 | Austin | A01M 25/002 |
| 2001/0009399 A1 * | 7/2001 | Barber | A01M 1/026 340/573.2 |
| 2001/0054962 A1 | 12/2001 | Barber et al. | |
| 2004/0031190 A1 * | 2/2004 | Collins | A01M 1/026 43/132.1 |
| 2004/0187378 A1 | 9/2004 | Cink et al. | |
| 2006/0162236 A1 * | 7/2006 | French | A01M 1/026 43/132.1 |
| 2006/0207164 A1 * | 9/2006 | Pearson | A01M 1/026 43/132.1 |
| 2006/0254123 A1 * | 11/2006 | Su | A01M 1/026 43/132.1 |
| 2008/0156672 A1 * | 7/2008 | Shih | A23L 3/26 206/217 |
| 2009/0300968 A1 * | 12/2009 | Zajac | A01M 1/026 43/132.1 |
| 2010/0083556 A1 * | 4/2010 | Wright | A01M 1/026 43/1 |

FOREIGN PATENT DOCUMENTS

| | | | | |
|---|---|---|---|---|
| GB | 1 513 190 | | | 6/1978 |
| JP | 07043460 A | | | 2/1995 |
| JP | 9-26320 A | | | 1/1997 |
| JP | 09098701 A | | | 4/1997 |
| JP | 09172934 A | | | 7/1997 |
| JP | 09172934 A | * | | 7/1997 |
| JP | 10056935 A | | | 3/1998 |
| JP | 10-84834 | | | 4/1998 |
| JP | 10105861 A | | | 4/1998 |
| JP | 2002315493 A | | | 10/2002 |
| JP | 2002315493 A | * | | 10/2002 |
| JP | 2003/144029 A | | | 5/2003 |
| JP | 2003144029 A | * | | 5/2003 |
| JP | 2003304790 A | * | | 10/2003 |
| JP | 2003304790 A | | | 10/2003 |
| JP | 2004033177 A | * | | 2/2004 |
| JP | 2004033177 A | | | 2/2004 |
| JP | 2004135516 A | | | 5/2004 |
| JP | 2004135516 A | * | | 5/2004 |
| JP | 2006034207 A | * | | 2/2006 |
| JP | 2006034207 A | | | 2/2006 |
| JP | 2008/161130 A | | | 7/2008 |
| JP | 2008161130 A | * | | 7/2008 |
| WO | WO 93/23998 | | | 12/1993 |
| WO | WO 98/46071 | | | 10/1998 |
| WO | WO 2003/081998 A1 | | | 10/2003 |
| WO | WO-03081998 A | * | | 10/2003 |
| WO | WO 2007/106726 | | | 9/2007 |
| WO | WO 2008/063939 | | | 5/2008 |
| WO | WO-2008063939 A2 | * | 5/2008 | A01M 1/026 |

OTHER PUBLICATIONS

Written Opinion, SG20100029-5, Dow AgroSciences LLC, Hungarian Intellectual Property Office, dated Mar. 9, 2011.

European Search Report and Opinion prepared for EP 15184318, dated Apr. 19, 2016.

* cited by examiner

TECHNIQUES FOR MAINTAINING PALATABILITY OF A BAIT MATERIAL IN A PEST CONTROL DEVICE

CROSS-REFERENCE TO RELATED APPLICATIONS

The present application is a divisional application of U.S. patent application Ser. No. 14/485,113 filed Sep. 12, 2014, which is a divisional application of U.S. patent application Ser. No. 13/462,866 filed May 3, 2012, now U.S. Pat. No. 8,832,994, which is a continuation of U.S. patent application Ser. No. 12/220,458 filed Jul. 24, 2008, now U.S. Pat. No. 8,196,342, which claims the benefit of U.S. Provisional Application No. 60/962,024 filed 26 Jul. 2007. The contents of these applications are incorporated herein by reference in their entirety.

BACKGROUND

The present application relates to pest control, and more particularly, but not exclusively, relates to techniques for maintaining palatability of a bait material included in a pest control device.

The removal of pests from areas occupied by humans, livestock, and crops has long been a challenge. Pests of frequent concern include various types of insects and rodents. Subterranean termites are a particularly troublesome type of pest with the potential to cause severe damage to wooden structures. Various schemes have been proposed to eliminate termites and certain other harmful pests of both the insect and noninsect variety. In one approach, pest control relies on the blanket application of chemical pesticides in the area to be protected. However, this approach is becoming less desirable than targeted pesticide delivery, which can be more efficient and environmentally friendly.

Recently, advances have been made to provide for the targeted delivery of pesticide chemicals. U.S. Pat. No. 5,815,090 to Su is one example. Another example directed to termite control is the SENTRICON TERMITE COLONY ELIMINATION SYSTEM™ of Dow AgroSciences that has a business address of 9330 Zionsville Road, Indianapolis, Ind. In this system, a number of units each having a termite edible material, are placed in the ground about a dwelling to be protected. The units are inspected routinely by a pest control service for the presence of termites, and inspection data is recorded with reference to a unique barcode label associated with each unit. If termites are found in a given unit, a bait is installed that contains a slow-acting pesticide intended to be carried back to the termite nest to eradicate the colony. U.S. Pat. Nos. 6,724,312; 7,212,112; and 7,212,129; and U.S. Patent Application Publication Nos. 2001/0033230 and 2001/0054962 provide further examples.

In certain instances, the bait degrades with exposure to moisture, which can undermine its appeal to targeted pests, and sometimes results in improper operation of associated sensors (if present). Frequently, it is desirable to maintain the palatability of the bait over a longer period of time and/or better control moisture intrusion. Thus, there is a demand for further contributions in this area of technology.

SUMMARY

One embodiment of the present application is a unique technique for pest control. Other embodiments including unique apparatus, systems, methods, and devices to protect an in-ground bait from moisture intrusion or the like. Further embodiments, forms, objects, features, advantages, aspects, and benefits shall become apparent from the following description and drawings.

DETAILED DESCRIPTION OF REPRESENTATIVE EMBODIMENTS

Figure 1:
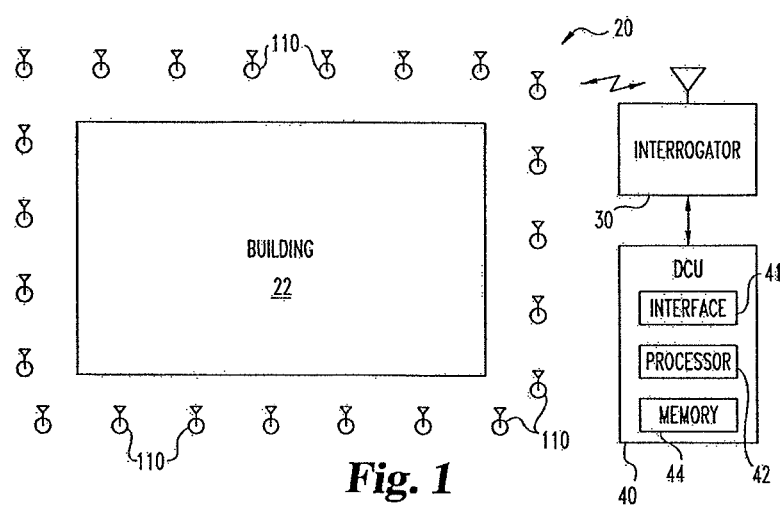
FIG. 1 is a diagrammatic view of a pest control system according to the present application that includes several pest control devices.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application is a pest control device structured to reduce bait damage cause by unwanted water intrusion when installed in the ground. In one form, the pest control device is a bait container that defines a lower entry point for access by the targeted pests and a pocket to trap air between this entry point and bait positioned above it. This air-trapping pocket prevents water from reaching the bait. The container may be placed in the cavity of an in-ground housing previously installed in the ground or may be used without such a housing. Alternatively or additionally, the container may include a sensor to detect pest presence. The pest control system 20 of FIGS. 1-13 provides a further example of such an implementation.

FIG. 1 illustrates pest control system 20. System 20 is arranged to protect building 22 from damage due to pests, such as subterranean termites. System 20 includes a number of pest control devices 110 positioned about building 22. In FIG. 1, only a few of devices 110 are specifically designated by reference numerals to preserve clarity. System 20 also includes a portable interrogator 30 to gather information about devices 110. Data gathered from devices 110 with interrogator 30 is collected in Data Collection Unit (DCU) 40 through communication interface 41. In other implementations, DCU 40 may not be present or only optionally utilized, instead using interrogator 30 as the terminal data gathering equipment.

Figure 2:
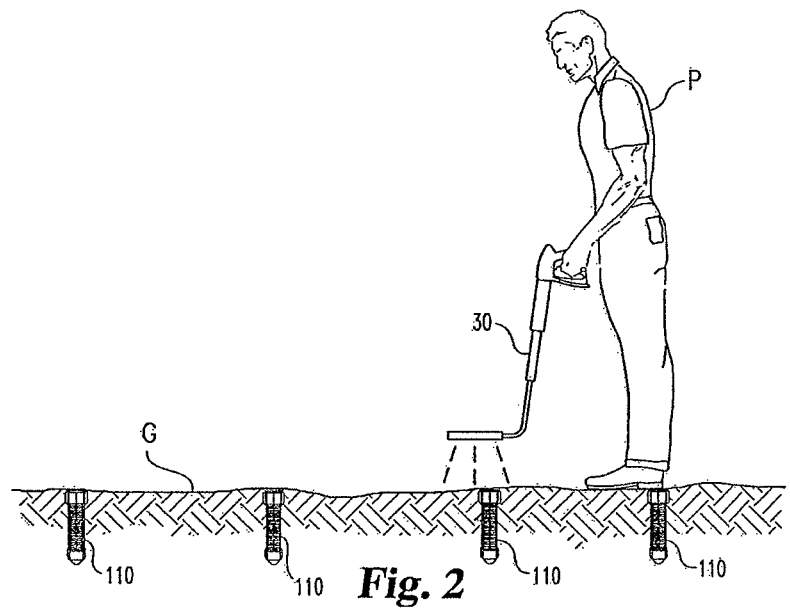
FIG. 2 is a further view of selected aspects of the system of FIG. 1 in operation.

Referring additionally to FIG. 2, certain aspects of the operation of system 20 are illustrated. In FIG. 2, a pest control service provider P is shown operating interrogator 30 to interrogate pest control devices 110 located at least partially below ground G using a wireless communication technique that does not require electrical contact between interrogator 30 and device 110 as further explained hereinafter. In this example, interrogator 30 is shown in a handheld form convenient for sweeping over ground G to establish wireless communication with installed devices 110. As an alternative or addition to this contactless technique, interrogator 30 may make electrical and/or mechanical contact with each device 110 to gather data. In lieu of or along with interrogator 30, information about each pest control device 110 can be reported in a different manner, such as with a visual and/or aural indicator fixed to device 110 in still other embodiments.

Figure 3:
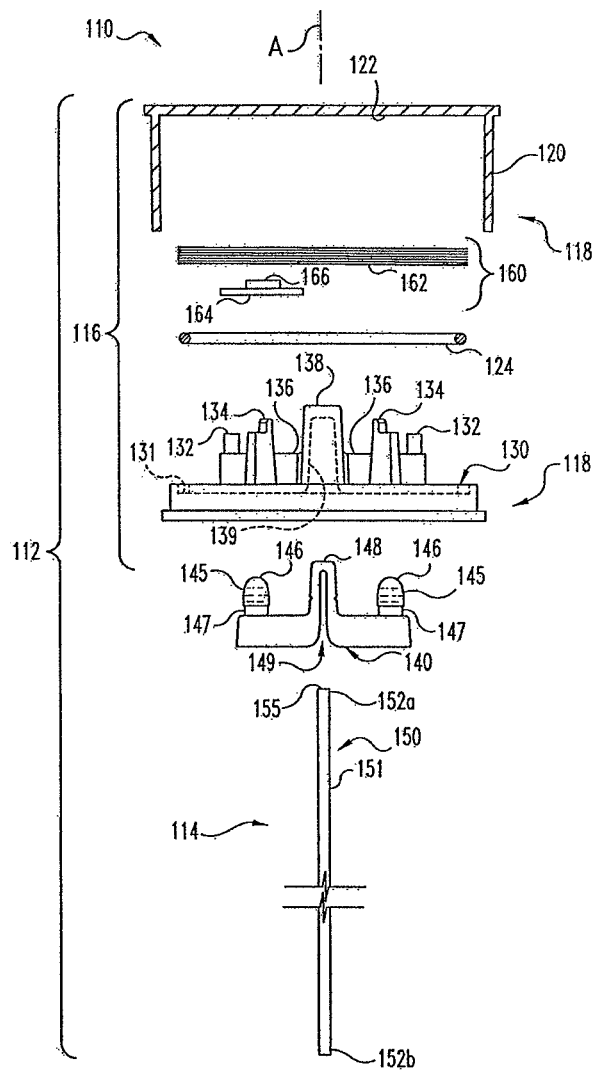
FIG. 3 is a partial, exploded sectional view of a pest monitoring assembly of one of the pest control devices.
Figure 4:
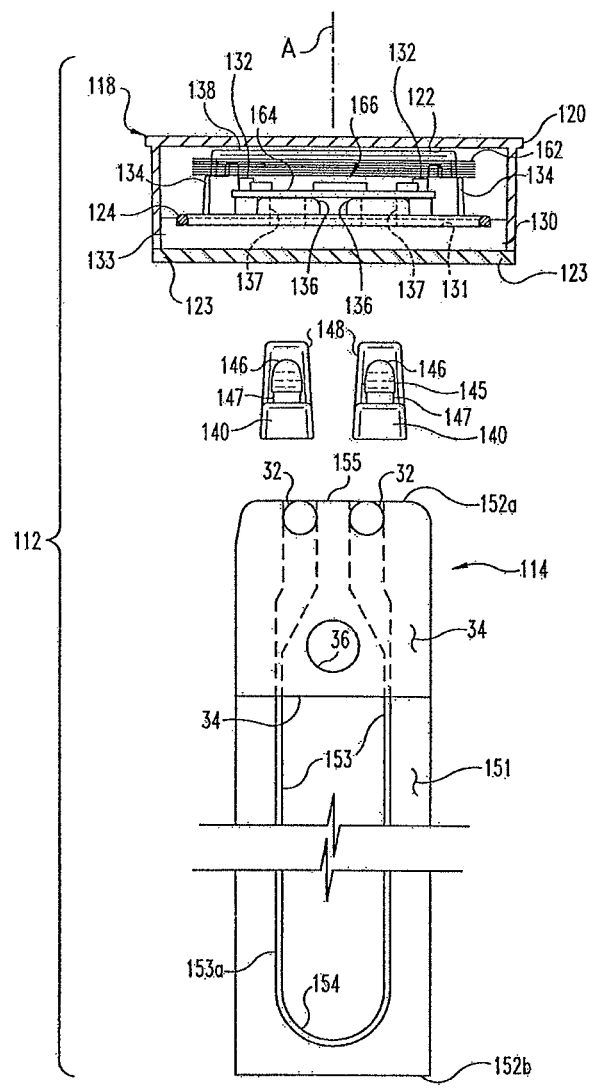
FIG. 4 is a partial, exploded sectional view of the pest monitoring assembly of FIG. 3 along a view plane perpendicular to the view plane of FIG. 3.

FIGS. 3-12B illustrate various features of pest control device 110. To detect pests and apply a pesticide, pest control device 110 is internally configured with pest monitoring assembly 112 structured for assembly in a bait container as further described in connection with FIGS. 6-12B. Referring more specifically to FIGS. 3 and 4, pest monitoring assembly 112 is illustrated in part along centerline assembly axis A. Axis A coincides with the view planes of both FIGS. 3 and 4; where the view plane of FIG. 4 is perpendicular to the view plane of FIG. 3.

Pest monitoring assembly 112 includes sensor subassembly 114 below communication circuit subassembly 116 along axis A. Sensor subassembly 114 includes sensor 150. Sensor 150 is structured for contact with bait as more fully described hereinafter in connection with FIGS. 10-12B; however, certain details of sensor 150 are described first as follows. Sensor 150 is generally elongated and has end portion 152a opposite end portion 152b as shown in FIGS. 3 and 4, for example. A middle portion of sensor 150 is represented by a pair of adjacent break lines separating portions 152a and 152b in FIGS. 3 and 4. Sensor 150 includes sensing substrate 151. Substrate 151 carries conductor 153 that is arranged to provide sensing element 153a in the form of an electrically conductive loop or pathway 154 shown in the broken view of FIG. 4. Along the middle sensor portion represented by the break lines of FIG. 4, the two segments of pathway 154 continue along a generally straight, parallel route (not shown), and correspondingly end at contact pads 32 at along an edge of end portion 152a. An electrically insulating film 34 covers a portion of each of the segments along end portion 152a. The film-covered segment portions are shown in phantom. Aperture 36 is formed through substrate 151 between the segments covered by film 34 that may be used for manufacturing and/or handling. At end portion 152b, the segments join each other to form pathway 154, completing the electrically conductive loop.

Substrate 151 and/or conductor 153 are/is comprised of one or more materials susceptible to consumption or displacement by the pests being monitored with pest monitoring assembly 112. These materials can be a food substance, a nonfood substance, or a combination of both for the one or more pest species of interest. Indeed, it has been found that materials composed of nonfood substances will be readily displaced during the consumption of adjacent edible materials by termites. As substrate 151 or conductor 153 are consumed or displaced, pathway 154 is eventually altered. This alteration can be utilized to indicate the presence of pests by monitoring one or more corresponding electrical properties of pathway 154 as will be more fully described hereinafter. Alternatively, substrate 151 and/or conductor 153 can be oriented with respect to bait members 132 so that a certain degree of consumption or displacement of bait members 132 exerts a mechanical force sufficient to alter the electrical conductivity of pathway 154 in a detectable manner. For this alternative, substrate 151 and/or conductor 153 need not be directly consumed or displaced by the pest of interest.

In one embodiment directed to subterranean termites, substrate 151 is formed from a cellulose material that is consumed, displaced, or otherwise removed by the termites. One specific example includes a paper coated with a polymeric material, such as polyethylene. Nonetheless, in other embodiments, substrate 151 may be composed of different materials that target termites and/or other pests of interest.

In one form, conductor 153 is provided by a carbon-based conductive material, such as a carbon-containing ink compound. One source of such ink is the Acheson Colloids Company with a business address of 1600 Washington Ave., Port Huron, Mich. 48060. Carbon-containing conductive ink comprising conductor 153 can be deposited on substrate 151 using a silk screening, pad printing, or inkjet dispensing technique; or such other technique as would occur to those skilled in the art. Compared to commonly selected metallic conductors, a carbon-based conductor can have a higher electrical resistivity. Preferably, the volume resistivity of the carbon-containing ink compound is greater than or equal to about 0.001 ohm-cm (ohm-centimeter). In a more preferred embodiment, the volume resistivity of conductor 153 comprised of a carbon-containing material is greater than or equal to 0.1 ohm-cm. In a still more preferred embodiment, the volume resistivity of conductor 153 comprised of a carbon-containing material is greater than or equal to about 10 ohms-cm. In yet other embodiments, conductor 153 can have a different composition or volume resistivity as would occur to those skilled in the art.

Pest monitoring assembly 112 further includes circuit subassembly 116 removably connectable to sensor subassembly 114. Circuit subassembly 116 is arranged to detect and communicate pest activity as indicated by a change in one or more electrical properties of pathway 154 of sensor subassembly 114. Circuit subassembly 116 includes circuit enclosure 118 for communication circuitry 160 and a pair of connection members 140 for detachably coupling communication circuitry 160 to sensor 150 of sensor subassembly 114. Enclosure 118 includes cover piece 120, o-ring 124, and base 130, that each have a generally circular outer perimeter about axis A. Enclosure 118 is shown more fully assembled in FIG. 4 than in FIG. 3. Cover piece 120 defines cavity 122. Base 130 defines channel 131 (shown in phantom) sized to receive o-ring 124 (see FIG. 4). As an alternative or addition to the 0-ring 124, a heat seal may be used.

Figure 5:
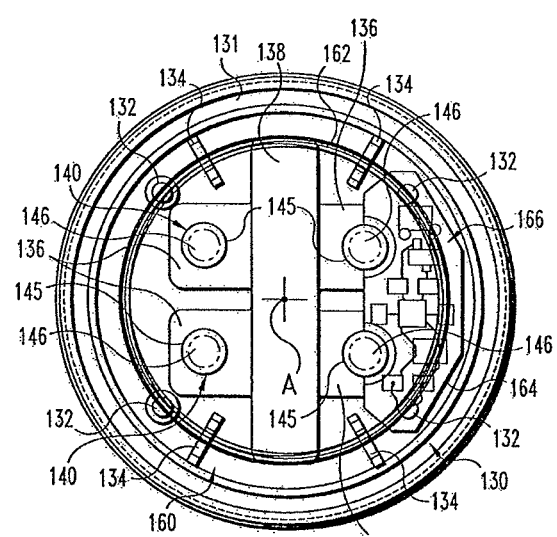
FIG. 5 is a partial, top view of a portion of a communication circuit subassembly of the pest monitoring assembly shown in FIGS. 3 and 4.

Communication circuitry 160 is positioned between cover piece 120 and base 130. Communication circuitry 160 includes coil antenna 162 and printed wiring board 164 carrying circuit components 166. Referring also to FIG. 5, a top view is shown of an assembly of base 130, connection members 140, and wireless communication circuitry 160. In FIG. 5, axis A is perpendicular to the view plane and is represented by like labeled cross-hairs. Base 130 includes posts 132 to engage mounting holes through printed wiring board 164. Base 130 also includes mounts 134 to engage coil antenna 162 and maintain it in fixed relation to base 130 and printed wiring board 164 when assembled together. Base 130 further includes four supports 136 each defining opening 137 therethrough as best illustrated in FIG. 4. Base 130 is shaped with a centrally located projection 138 between adjacent pairs of supports 136. Projection 138 defines recess 139 (shown in phantom in FIG. 3).

Referring generally to FIGS. 3-5, connection members 140 each include a pair of connection nubs 146. Each nub 146 has neck portion 147 and head portion 145 that extend from opposing end portions of the respective connection member 140. For each connection member 140, projection 148 is positioned between the corresponding pair of nubs 146. Projection 148 defines recess 149. Connection members 140 are formed from an electrically conductive, elastomeric material. In one embodiment, each connection member 140 is made from a carbon-containing silicone rubber, such as compound 862 available from TECKNIT USA, having a business address of 135 Bryant Street, Cranford, N.J. 07016. Nonetheless, in other embodiments, a different composition can be used.

To assemble each connection member 140 to base 130, the corresponding pair of nubs 146 is inserted through a respective pair of openings 137 of supports 136, with projection 148 extending into recess 139. Head portion 145 of each of nubs 146 is sized to be slightly larger than the respective opening 137 through which it is to pass. As a result, during insertion, head portions 145 are elastically deformed until fully passing through the respective opening 137. Once head portion 145 extends through opening 137, it returns to its original shape with neck 147 securely engaging the opening margin. As shown in FIG. 5, printed wiring board 164 contacts one nub 146 of each connection member 140 after assembly.

Once connection members 140 are assembled with base 130, enclosure 118 is assembled by connecting base 130 to cover piece 120 with o-ring 124 carried in channel 131. A potting compound may be used inside the resulting structure to reduce moisture intrusion and/or other foreign agents. Further, as previously noted, a heat sealing technique can be used in addition to or in lieu of the o-ring 124/channel 131 structure. After communication circuit subassembly 116 is assembled, sensor 150 is assembled to subassembly 116 by asserting end portion 152a into recess 149 of each connection member 140 carried by base 130. Connection members 140 are sized to be slightly elastically deformed by the insertion of end portion 152a into recess 149, such that a biasing force is applied by connection members 140 to end portion 152a to securely hold sensor 150 in contact therewith. Once end portion 152a is inserted into connection members 140, each pad 32 is electrically contacted by a different one of connection members 140. In turn, each nub 146 that contacts printed wiring board 164 electrically couples pathway 154 to printed wiring board 164.

Figure 6:
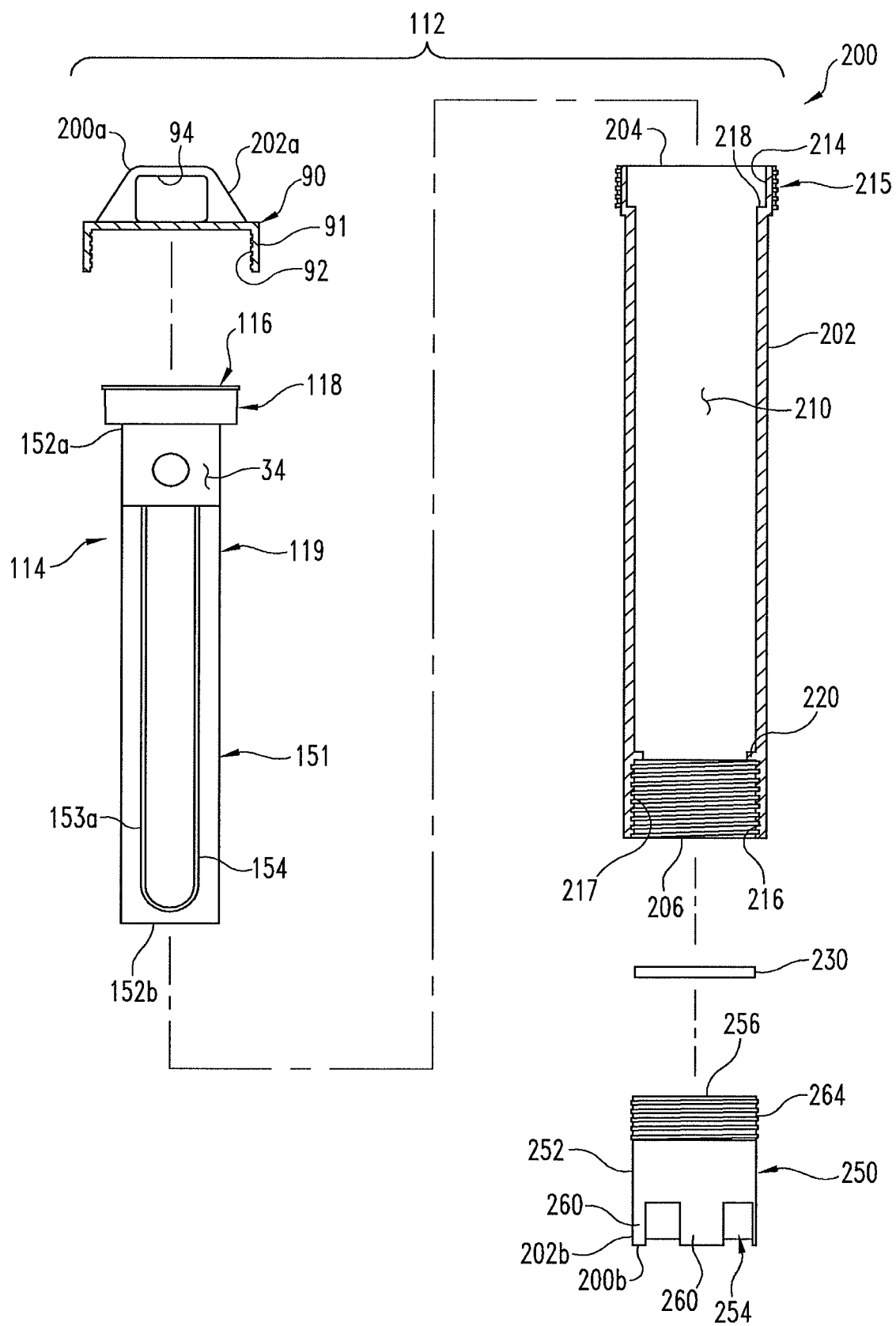
FIG. 6 is an exploded view of a bait container of one of the pest control devices including the pest monitoring assembly of FIG. 3.

FIG. 6 illustrates the resulting assembly of subassembly 114 and 116 as part of an exploded view of a higher assembly stage of pest control device 110. In FIG. 6, pest monitoring assembly 112 is alternatively designated sensing assembly 119, and collectively represents the assembled form of subassemblies 114 and 116. Once assembled, sensing assembly 119 is structured to facilitate installation and other handling as a unit. FIG. 6 also depicts bait container 200 in exploded form, which includes sensing assembly 119 when fully assembled. Bait container 200 also includes a tubular body 202 with an upper end portion 204 opposite a lower end portion 206. Body 202 is hollow to define interior space 210 to receive bait as more fully described hereinafter. Upper end portion 204 defines upper opening 214 that intersects interior space 210 and lower end portion defines lower opening 216 that also intersects interior space 210. Accordingly, openings 214 and 216 are in fluid communication with each other. Upper end portion 204 defines exterior helical threading 215 about opening 214 and lower end portion 206 defines interior helical threading 217 about opening 216.

Figure 10:
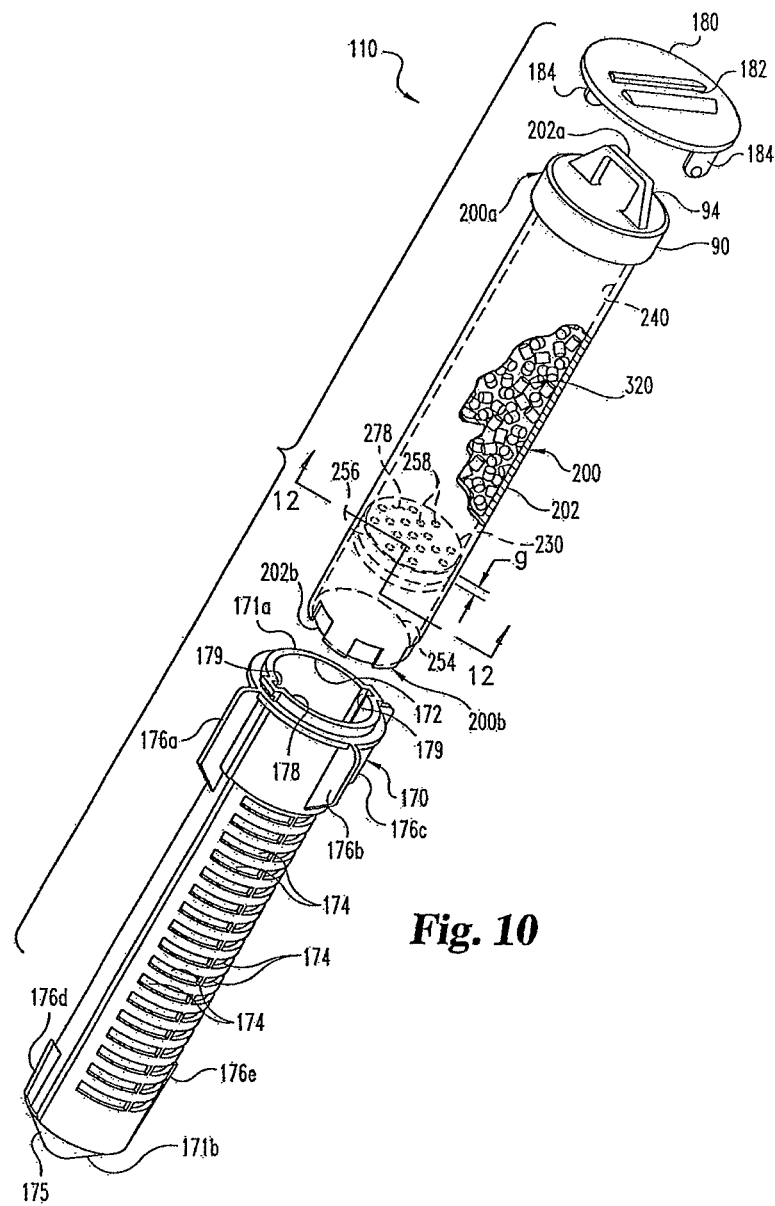
FIG. 10 is a perspective exploded view of the pest control device assembly of FIG. 6 with a diagrammatic cut away of the bait container and further showing a ground installable housing of one of the pest control devices.
Figure 11:
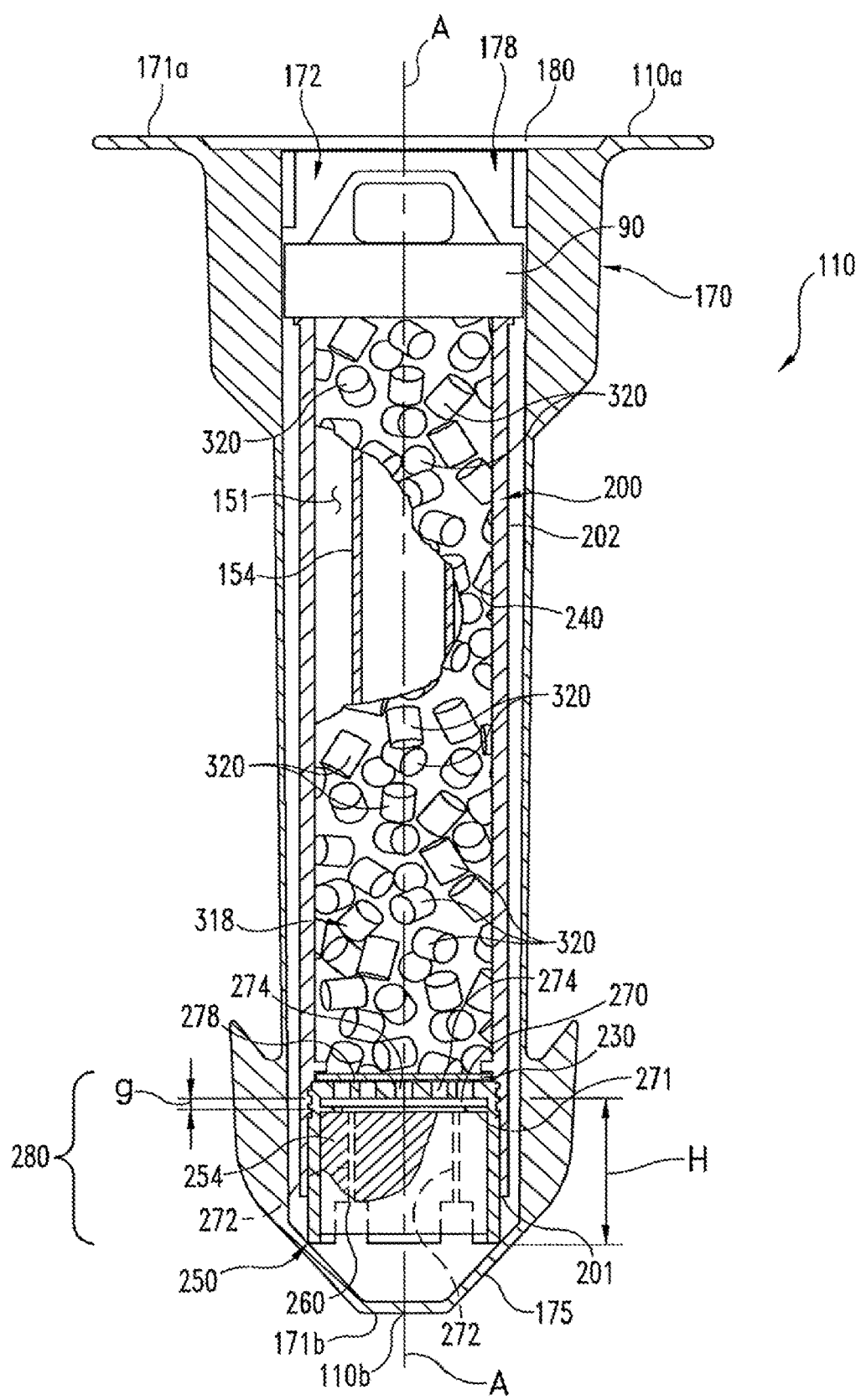
FIG. 11 is a side, diagrammatic partial sectional, partial cutaway view of the assembly of FIG. 10.

Sensing assembly 119 is sized and shaped to be received in interior space 210 of container 200 through upper opening 214. Upper end portion 204 defines a ledge to provide seat 218 for which enclosure 118 of assembly 119 is structured to rest, suspending substrate 151 below in interior space 210 (See also the views of FIG. 11 and FIG. 12A) when assembly 119 is placed therein. Bait container 200 (and correspondingly pest control device 110) further includes closure 90 in the form of a cap 91. Closure 90 includes interior threading 92 structured to engage exterior threading 215 of upper end portion 204 of body 202. Cap 91 includes handle 94 structured for grasping by hand or some type of an extraction tool to carry and otherwise manipulate bait container 200 as further described hereinafter. Closure 90 can be selectively rotated relative to upper end portion 204 to be threaded thereto and provide an airtight seal. This state is illustrated in FIGS. 10 and 11. Accordingly, after insertion of assembly 119 in chamber 202, closure 90 can be engaged to upper end portion 204, and likewise can be removed to access assembly 119 as desired.

Bait container 200 also includes moisture barrier 230 shaped and sized to snuggly fit in tubular body 202 through lower opening 216 to engage lower seat 220. In one form, barrier 230 is a disk comprised of a sheet of cork or wood. In other embodiments, barrier 230 may be comprised of a different material and/or may be absent. Barrier 230 divides interior space 210 of body 202 to define a lower boundary 278 of a bait containing chamber 240 in body 202, which is illustrated in FIGS. 10-12B.

Figure 7:
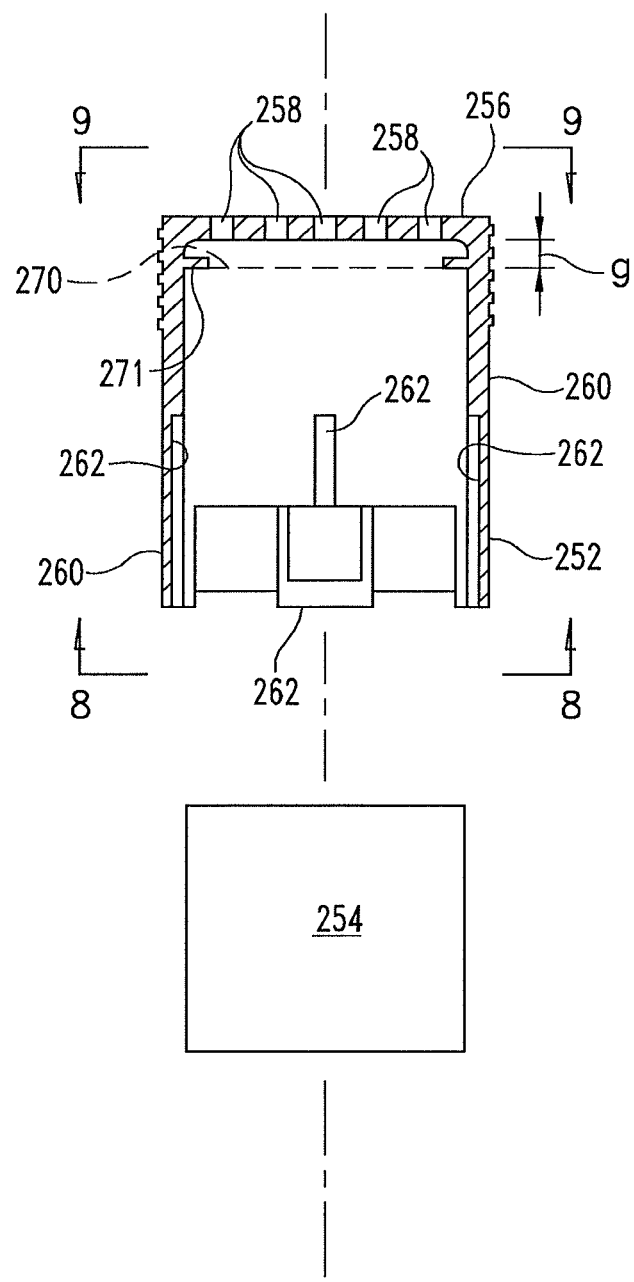
FIG. 7 is an exploded view of a pest access arrangement of the pest control device of FIG. 6.
Figure 8:
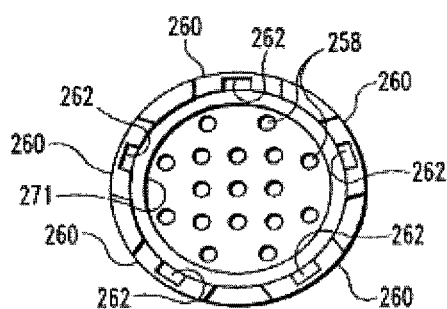
FIG. 8 is a bottom plan view of the fitting included in the pest access arrangement taken along the view line 8-8 of FIG. 7.
Figure 9:
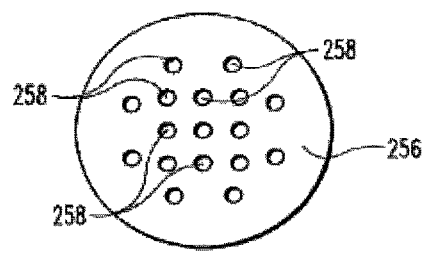
FIG. 9 is a top plan view of the fitting included in the pest access arrangement taken along the view line 9-9 of FIG. 7.

Barrier 230 is held in place by pest access arrangement 250. Pest access arrangement 250 includes fitting 252 and termite palatable plug 254 carried by fitting 252. Referring especially to FIGS. 6-9, fitting 252 includes partition 256 defining a number of openings 258 therethrough. Fitting 252 includes sidewalls 260 downwardly extending from partition 256 to capture plug 254 in fitting 252 by friction fit and/or with the aide of a connector, adhesive, or the like. Sidewalls 260 each define a groove or channel 262 that terminates a selected distance below partition 256. When plug 254 is assembled in fitting 252, it contacts the sidewalls 260 such that it forms a boundary of channels 262 providing a guide way to route termites as further described hereinafter. Fitting 252 is structured with an internal ledge 271 to maintain plug 254 in a spaced apart relationship from partition 256 to form a termite aggregation chamber gap g therebetween as illustrated in FIGS. 7 and 10. As shown in FIGS. 7, 10, and 11, lower chamber 270 is correspondingly defined below partition 256 and above plug 254. In one preferred embodiment, gap g is less than 5 millimeters (mm) In a more preferred embodiment, gap g is less than about 3 mm and more than about 1 mm. In an even more preferred form, gap g is about 2 mm Nonetheless, in other embodiments, gap g may be absent or may be differently dimensioned.

Fitting 252 includes exterior threading 264 to engage interior threading 217 of lower end portion 206. When threaded through opening 216, pest access arrangement initially provides a barrier to termites and moisture because plug 254 closes off openings 258 and chamber 270 from access below. However, plug 254 is comprised of a material that is attractive and removable by termites. Bounded by a surface of plug 254, channels 262 provide pathways to route termites to an upper portion of plug 254 that they consume or displace to form one or more passageways 272 therethrough as schematically illustrated in FIG. 11.

Chamber 240 contains bait 318. In one form targeted to termites, bait 318 is comprised of a multiple pellets 320 that each include a cellulose attractive to termites and a pesticide. For this form, pellets 320 of bait 318 conform to the shape of chamber 310 occupying a geometric center thereof and spanning across its longitudinal centerline A. Nonetheless, in other embodiments, bait 318 may be differently composed to target to a different pest type, may include more or fewer pieces, may be a single piece such as a wood or synthetically formed cellulose block, may include an attractant with or without pesticide, and/or may be otherwise differently constituted.

Figure 12A:
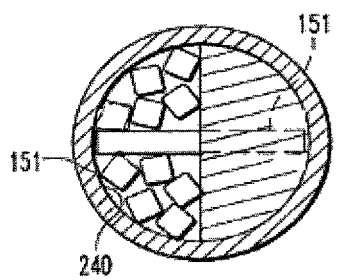
FIG. 12A is a diagrammatic sectional view taken along the section line 12-12 of FIG. 11.
Figure 12B:
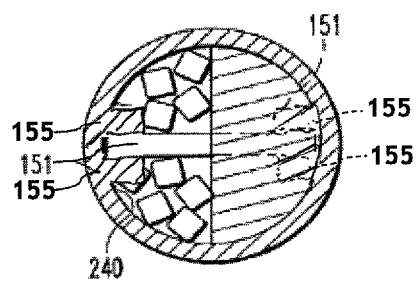
FIG. 12B is diagrammatic sectional view similar to FIG. 12A.

To assemble bait container 200, sensing assembly 119 is placed in interior space 210 of body 202 through proximal end portion 204 to engage upper seat 218. After placement of sensing assembly 119 in body 202, closure 90 is threaded on proximal end portion 204 to close opening 214 with an airtight seal. Container 200 is inverted to load bait 318 through opening 216 to at least partially fill the portion of interior space 210 that may reach up to lower seat 220. In one form, pellets 320 of bait 318 are distributed along opposite sides of substrate 151 as illustrated in FIG. 12A. The body 202 may include one or more interior slots 155 and/or guide flanges, as shown in FIG. 12B, to assist with maintaining substrate 151 in a desired position as bait 318 is distributed thereabout. After loading bait 318, barrier 230 is placed through opening 216 to engage lower seat 220. Pest access arrangement 250 is threaded into opening 206 to capture barrier 230 between partition 256 and lower seat 220. So assembled, bait container 200 includes body 202, closure 90, barrier 230, and arrangement 250; and collectively has upper end portion 200a opposite lower end portion 200b. Upper end portion 200a defines top terminus 202a of container 200 and lower end portion 200b defines bottom terminus 202b of container 200. Body 202, closure 90, and arrangement 250 are generally annular/cylindrical; however, in other embodiments shape of one or more of these components may vary with corresponding adjustments to accommodate assembly, coupling of components to one another, or the like as would occur to those skilled in the art. These components are comprised of a material suitable for placement in the ground that resists removal/damage by pests that are expected to be present and degradation caused by the environment. In one nonlimiting form, these components are made of an organic polymer compound.

FIGS. 10 and 11 illustrate housing 170 of pest control device 110. Housing 170 includes removable cap 180. Housing 170 is arranged for installation in the ground G as shown, for example, in FIG. 2. Housing 170 defines a chamber or interior space 172 intersecting access opening 178. Bait container 200 is sized for insertion into interior space 172 through opening 178 without any portion of container 200 protruding above opening 178. Housing 170 has an access end portion 171a opposite a below-ground end portion 171b. End portion 171b includes tapered end 175 to assist with placement of pest control 110 in the ground as illustrated in FIG. 2. End 175 terminates in an aperture (not shown). In communication with interior space 172 are preferably a number of passages 174 defined by housing 170. Passages 174 are particularly well-suited for the ingress and egress of termites from interior space 172. Housing 170 has a number of protruding flanges a few of which are designated by reference numerals 176a, 176b, 176c, 176d, and 176e in FIG. 10 to assist with positioning of pest control device 110 in the ground. Housing 170 includes cap 180 to cover opening 178. Cap 180 includes downward prongs 184 arranged to engage channels 179 of housing 170. After cap 180 is fully seated on housing 170, it can be rotated to engage prongs 184 in a latching position with a bayonet style connection that resists disassembly. Slot 182 can be used to engage cap 180 with a tool such as a top cap wrench, such as a flat-bladed screwdriver, to assist in rotating cap 180. Housing 170 and cap 180 be made of a material resistant to deterioration by expected environmental exposure and resistant to alteration by the pests likely to be detected with pest control device 110. In one form, these components are made from a polymeric resin like polypropylene or CYCOLAC AR polymeric plastic material available from General Electric Plastics, having a business address of One Plastics Avenue Pittsfield, Mass. 01201.

In a typical application directed to termite control, housing 170 is installed in ground with end portion 171b penetrating below ground level and end portion 171a being positioned approximately at ground level. With cap 180 removed, bait container 200 is inserted into space 172 of housing 170 through opening 178 to rest therein with lower end portion 200b entering first to be farther below ground level than upper end portion 200a. After placement of bait container 200 in housing 170 in-ground, cap 180 engages end portion 171a to cover opening 178. In relation to such operation and handling of housing 170 and container 200, portions 171a and 200a are also designated as proximal end portions and portions 171b and 200b are also designated as distal end portions. Likewise each resulting pest control device has proximal end portion 100a opposite distal end portion 100b (See FIG. 11).

In one procedure implemented with system 20, a number of pest control devices 110 are installed in a spaced apart relationship relative to an area to be protected. By way of nonlimiting example, FIG. 1 provides a diagram of one possible distribution of a number of devices 110 arranged about building 22 to be protected. Typically each of devices 110 is at least partly below ground as illustrated in FIG. 2. It has been found that once a colony of termites establishes a pathway to a food source, they will tend to return to this food source. Consequently, devices 110 are placed in selected locations to establish such pathways with any termites that might be in the vicinity of the area or structures desired to be protected, such as building 22.

It has been found that baits installed in the ground are susceptible to various modes of degradation—many resulting from exposure to moisture. Typically, bait fouls or degrades/molds when it is saturated with water such as when the installed housing floods. Furthermore, when sensor 150 includes substrate 151 comprised of a moisture-alterable material, such as various types of paper or the like, it can be subject to water damage that results in a false indication of pest presence. By preventing bait 318 and/or sensor 150 from being degraded in such a manner, the longevity and palatability of bait 318 to targeted pests is enhanced and sensor 150 operation typically is more reliable. Referring to FIG. 11, container 200 is structured to reduce the chances of water reaching bait 318. As initially installed, barrier 230 and arrangement 250 each provide a barrier to moisture reaching lowermost boundary 278 of bait 318. However, the composition of barrier 230 and plug 254 facilitates removable by termites. Accordingly, as termites encounter housing 170, they passage through passages 174 to reach bait container 200. Because plug 254 is composed of a termite palatable material, termites are likely to form passages 272 therethrough to reach chamber 270—perhaps being guided by channels 262. As a result, the moisture barrier presented by arrangement 250 is breached. From chamber 270, termites are drawn to barrier 230 that is also made of a material favored by termites. Accordingly, termites in chamber 270 pass through openings 258 of partition 256 and form passages 274 to reach bait 318 in contact with barrier 230. As a result the moisture barrier provided by barrier 230 is breached.

As barrier 230 is removed and dispersed by termites, it should be appreciated that partition 256 is structured to define lowermost boundary 278b of bait 318 in bait chamber 240. As a part of fitting 250, partition 256 is comprised of a material not readily removed or altered by termites. Thus, while some smaller portions of bait 318 might drop through openings 258, the larger pieces of bait 318 are maintained in an upwardly offset position within body 202 of container 200 relative to terminus 202b. The corresponding offset distance H is illustrated in FIG. 11. With bait 318 being set back or recessed from the bottom end of container 200, pocket 280 can form. As illustrated in FIG. 11, pocket 280 includes chamber 270, passages 272, and passages 274 that all intersect to provide a pathway for termites to reach bait 318 in chamber 240. Pocket 280 can take on a number of different shapes and configurations, including any type of fluid communication pathway that has its nearest bait container entry point below bait 318. Accordingly, when closure 90 is engaged to body 202 of container to form an airtight seal therewith, this collective structure of container 200 provides an airtight boundary that extends from upper end portion 204 to the highest point of external entry of termites through arrangement 250 of lower end portion 206. Pocket 280 is formed between such entry point and bait 318 in chamber 240.

If water level in the ground extends higher than the highest external entry point of termites to bait 318 through access arrangement 250, the resulting pocket 280 traps air to prevent water from rising inside body 202 to bait 318 given the airtight boundary provided by body 202 down to this external point of entry. This trapped air forms an interface with water below it. The position of this interface is a function of a pressure balance between the air and water and can vary with environmental factors, such as temperature and outside air pressure. Typically, the air/water interface internal to body 202 may be upwardly recessed within body 202 to some degree as a result of compression of the trapped air by the water pressure exerted for given environmental conditions. Access arrangement 250 directs formation of such entry point(s) below bait 318 by distance H to provide adequate pocket formation under a desired range of environmental conditions to reduce the chances of water reaching bait 318 positioned above partition 256. In one preferred form, distance H is about 1 centimeter (cm). In a more preferred form, distance H is about 2.5 cm (1 inch).

Figure 13:
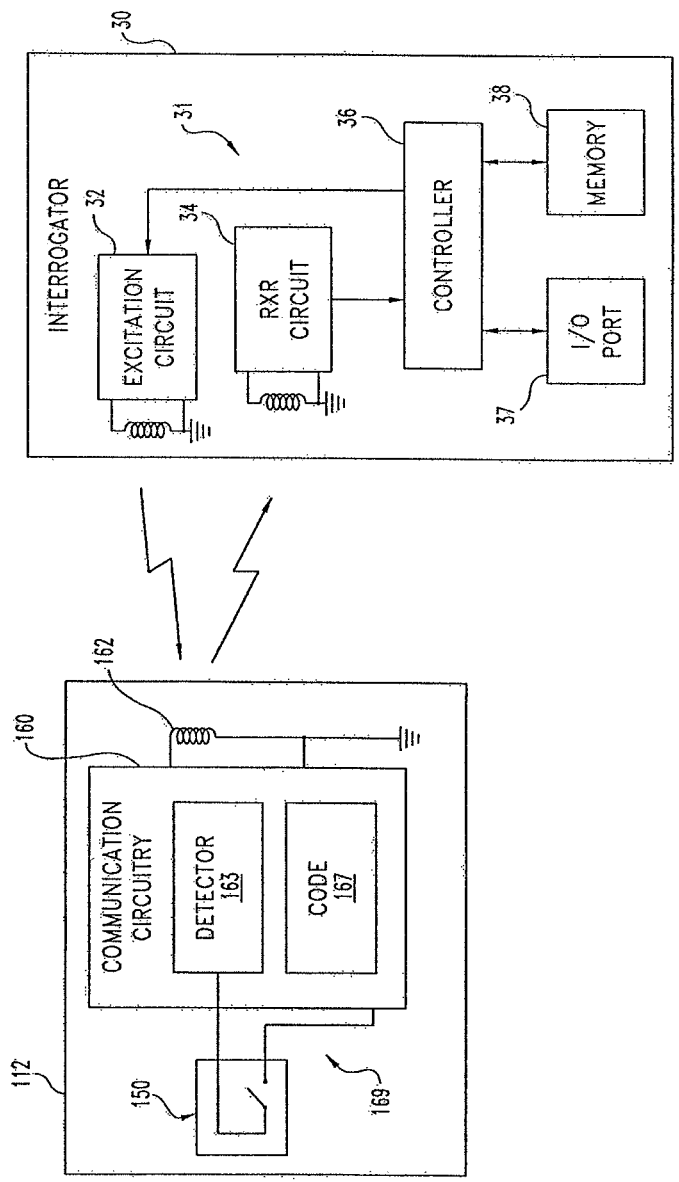
FIG. 13 is a schematic view of communication circuitry included in the pest control device of FIG. 11 and communication circuitry included the interrogator shown in FIGS. 1 and 2.

As termites reach bait 318 and invade chamber 240, alteration of substrate 151 is likely and eventually pathway 154 is broken, which can be used to signal the presence of termites with communication circuitry 160 of sensing assembly 119. In the depicted form, circuitry 160 is of a passive type that reports the status of pathway 154 in response to an external wireless signal from interrogator 30. FIG. 13 schematically depicts circuitry of interrogator 30 and pest monitoring assembly 112 for a representative pest control device 110. Monitoring circuitry 169 of FIG. 8 collectively represents communication circuitry 160 connected to conductor 153 of sensor 150 by connection members 140. In FIG. 13, pathway 154 of monitoring circuitry 169 is represented with a single-pole, single-throw switch corresponding to the capability of sensor 150 to provide a closed or open electrical pathway in accordance with pest activity. Further, communication circuitry 160 includes sensor state detector 163 to provide a two-state status signal when energized; where one state represents an open or high resistance pathway 154 and the other state represents an electrically closed or continuous pathway 154. Communication circuit 160 also includes identification code 167 to generate a corresponding identification signal for device 110. Identification code 167 may be in the form of a predetermined multibit binary code or such other form as would occur to those skilled in the art.

Communication circuitry 160 is configured as a passive RF transponder that is energized by an external stimulation or excitation signal from interrogator 30 received via coil antenna 162. Likewise, detector 163 and code 167 of circuitry 160 are powered by this stimulation signal. In response to being energized by a stimulation signal, communication circuitry 160 transmits information to interrogator 30 with coil antenna 162 in a modulated RF format. This wireless transmission corresponds to the termite presence determined with detector 163 and a unique device identifier provided by identification code 167.

FIG. 13 also illustrates communication circuitry 31 of interrogator 30. Interrogator 30 includes RF excitation circuit 32 to generate RF stimulation signals and RF receiver (RXR) circuit 34 to receive an RF input. Circuits 32 and 34 are each operatively coupled to controller 36. While interrogator 30 is shown with separate coils for circuits 32 and 34, the same coil may be used for both in other embodiments. Controller 36 is operatively coupled to Input/Output (I/O) port 37 and memory 38 of interrogator 30. Interrogator 30 has its own power source (not shown) to energize circuitry 31 that is typically in the form of an electrochemical cell, or battery of such cells (not shown). Controller 36 may be comprised of one or more components. In one example controller 36 is a programmable microprocessor-based type that executes instructions loaded in memory 38.

I/O port 37 is configured to send data from interrogator 30 to data collection unit 40 as shown in FIG. 1. Referring back to FIG. 1, further aspects of data collection unit 40 are described. Interface 41 of unit 40 is configured for communicating with interrogator 30 via I/O port 37. Unit 40 also includes processor 42 and memory 44 to store and process information obtained from interrogator 30 about devices 110. Processor 42 and memory 44 may be variously configured in an analogous manner to that described for controller 36 and memory 38, respectively. Further, interface 41, processor 42, and memory 44 may be integrally provided on the same integrated circuit chip.

Accordingly, for the depicted embodiment communication circuitry 160 transmits bait status and identifier information to interrogator 30 when interrogator 30 transmits a stimulation signal to device 110 within range. RF receiver circuit 34 of interrogator 30 receives the information from device 110 and provides appropriate signal conditioning and formatting for manipulation and storage in memory 38 by controller 36. Data received from device 110 may be transmitted to data collection unit 40 by operatively coupling I/O port 37 to interface 41.

After placement, installed devices 110 are periodically located and data is loaded from each device 110 by interrogation of the respective wireless communication circuit 160 with interrogator 30. This data corresponds to bait status and identification information. In this manner, pest activity in a given device 110 may readily be detected without the need to extract or open each device 110 for visual inspection. Further, such wireless communication techniques permit the establishment and building of an electronic database that may be downloaded into data collection device 40 for long term storage.

If status signal for a given device 110 indicates a broken pathway 154, the pest control service provider P can determine whether to visually inspect such device to add bait to container 200 by removing cap 190 and closure 90, otherwise leaving pest control device in situ within the ground. Alternatively or additionally, the service provided could remove assembly 119 through the open proximal end portion 110a of device 110, provide an unaltered substrate 151 to continue monitoring termite activity, or replace container 200 completely. Such procedures can be repeated for any other devices 110 for which termite activity is detected. After termite activity is detected, periodic replenishment of bait may be performed with or without further monitoring with sensing assembly 119.

Figure 14:
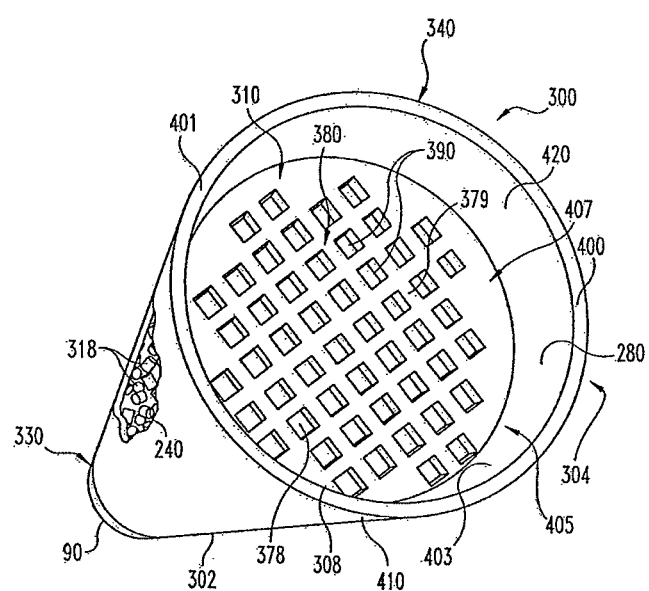
FIG. 14 is a perspective view of another pest control device with a partial cut away.
Figure 15:
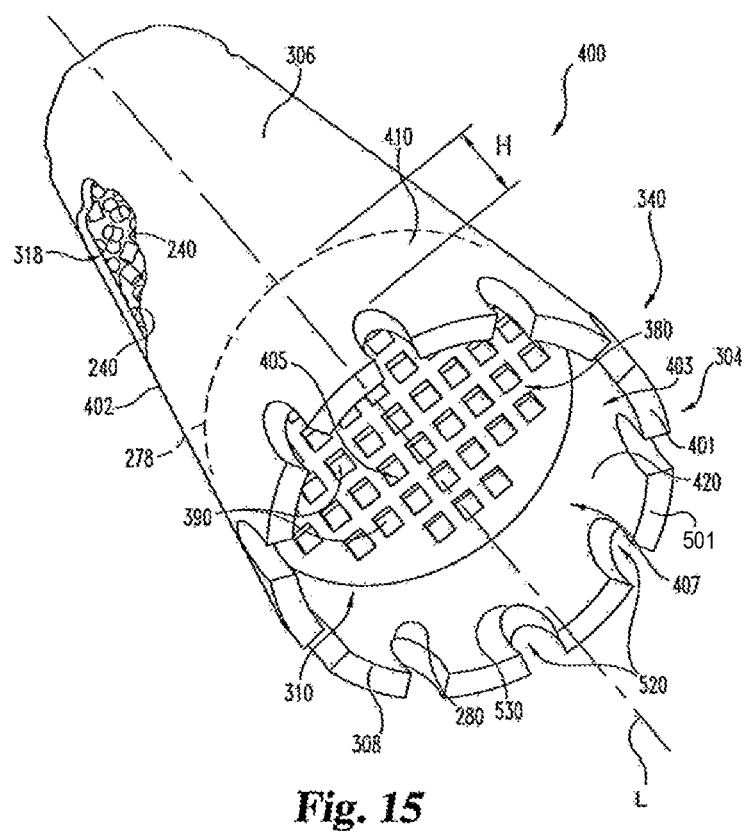
FIG. 15 is a perspective view of still another pest control device with a partial cut away.
Figure 16:
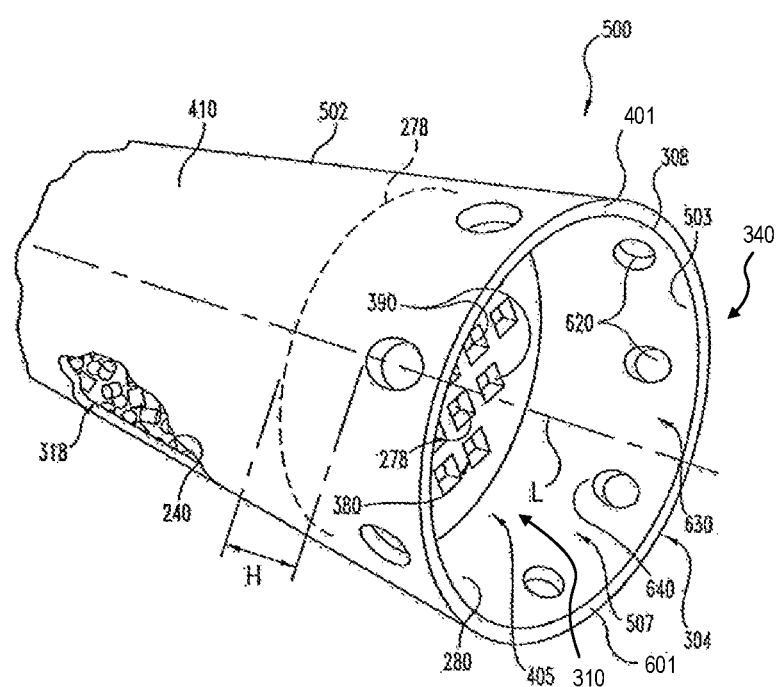
FIG. 16 is a perspective view of yet another pest control device with a partial cut away.

FIGS. 14-16 set forth a few, nonlimiting examples of alternative bait containers; where like reference numerals refer to like features previously described. Referring more specifically to the perspective view of FIG. 14, container 300 includes body 302 with an upper end portion 330 opposite lower end portion 340, and is configured to enter housing 170 in the same manner as described in connection with container 200. Upper end portion 330 is configured with a closure 90 like that previously described that is resealable—being engaged by threading to body 302. Container 300 can be internally structure with an upper seat to receive a sensing assembly 119 as previously described (not shown), or may not include any form of sensor.

Container 300 is structured to reduce the chances of water reaching bait 318 with a pest access arrangement defined by lower end portion 340, which is different than arrangement 250. Specifically, lower end portion 340 includes a lower edge 400 defined by the bottom terminus 401 of container 300 and setback member 379 in the form of partition 380 defining a lower boundary 378 for bait 318 within chamber 310. Partition 380 is recessed or set back a distance H from lower edge 400 forming a gap 403 therebetween. Gap 403 provides an air-trapping pocket 280 like that previously described when container 300 is placed in an upright orientation in the ground. Lower edge 400 defines a lower end opening 405 in lower end 304 of container 300 to allow entry of subterranean termites into chamber 240. Partition 380 includes a plurality of openings 390 intersecting chamber 240 and structured to facilitate access of subterranean termites to bait 318. Partition 380 can be in the form of a mesh screen attached to container 300. In one form of the present application, partition 380 is formed from a 7 Mesh plastic canvas available from Uniek, Inc. of Waunakee, Wis. and installed in chamber 310 with an adhesive.

Container 300 includes a sidewall 410 defining interior space 310, a portion of which provides bait chamber 240 previously described that has a lowermost boundary 378. A portion 420 of sidewall 410 extending from lower edge 400 to partition 380 preferably includes a roughed surface to assist in termite entry into chamber 310. Portion 420 may be roughed by known methods such as sandpaper roughing or other roughing techniques.

FIG. 15 illustrates a container 400 of a further embodiment of the present application. Container 400 includes body 402 that extends from the upper end (not shown) to lower end 304 about centerline L. Like container 300, container 400 includes interior space 310 a portion of which defines bait chamber 240. Chamber 240 contains bait 318 (shown in cut away). Container 400 includes upper end portion (not shown) opposite lower end portion 340. Lower end portion 340 includes a pest access arrangement comprising lower edge 501 defined by the bottom terminus 401 of container 400 and partition 380 below bait 318 within space 310. Partition 380 is recessed or set back a distance H from lower edge 501 forming gap 403. Gap 403 provides an air-trapping pocket 280 like that previously described when container 300 is placed in an upright orientation in the ground. Lower edge 501 defines opening 405 in lower end 304 of container 400 to allow entry of subterranean termites into chamber 310. In addition to opening 405, termites may enter space 310 through a plurality of open slots or notches 520 formed in lower edge 501. The addition of notches 520 provides a further passage for termite entry into container 400. The uppermost boundary of notches 520 provide the highest external entry point below bait 318 in chamber 240 of container 400; and thus, distance H, which corresponds to pocket 280, is designated from there.

FIG. 16 illustrates a container 500 of a further embodiment the present application. Container 500 extends from the upper end (not shown) to lower end 304 and is preferably symmetrical about longitudinal center line L. Like container 300, container 500 includes chamber 310 containing bait 318 (shown in cut away). Container 500 includes upper end portion (not shown) and lower end portion 340. Lower end portion 340 includes a pest access arrangement comprising lower edge 601 defined by the bottom terminus 401 of container 500 and partition 380 below bait 318 within chamber 310. Partition 380 is recessed or set back a distance H from lower edge 601 forming gap 503 therebetween. Gap 503 provides an air-trapping pocket 280 when container 500 is in upright use in housing 170 as previously described in connection with container 200. Edge 601 defines opening 405 in lower end 304 of container 500 to allow entry of subterranean termites into chamber 310. In addition to opening 405, termites may enter chamber 310 through a plurality of side openings 620 formed in a portion 630 of lower end portion 304. The uppermost boundary of openings 620 provide the highest external entry point below bait 318 in chamber 240 of container 500; and thus, distance H, corresponding to pocket 280 of container 500, is designated from there.

Like containers 200 and 300, containers 400 and/or 500 may include a closure 90 to seal the upper end and/or a sensor. In various alternative embodiments, bait container 200, 300, 400, and/or 500 is loaded with a bait that may or may not include an attractant, but not a pesticide. In this instance, sensing assembly 119 can be used to detect termite presence, and once detected, then pesticide is added to the bait and/or a pesticide-laden bait is substituted. In still other alternative embodiments, a bait container according to the present application is structured for installation in the ground directly without a housing. In a further alternative, the upper end of the bait container does not include a closure or opening—instead being an integral part of the container body that is structured to provide an airtight boundary down to a selected level of termite entry. In another embodiment, the bait container is not utilized with a sensing assembly 119. Additionally or alternatively, the container may not include a removable access arrangement like containers 300, 400, and 500, and/or may provide a pocket configuration different than those of containers 200, 300, 400, and 500 to selectively trap air for water intrusion protection. In yet further embodiments, the bait and/or container is modified to target non-termite pests. Still further embodiments include bait containers according to any of these variations that are installed in different environments other than an in-ground setting. While the illustrated embodiments indicate that bait 318 is supported by a lower member or partition, holding it in an offset position like a floor; it should be appreciated that in other embodiments, some or all of the bait may be suspended or otherwise secured in a bait chamber to provide an offset sufficient to benefit from an air-trapping pocket below. In one particular implementation, one or more portions of the bait may be held above the pocket to prevent water exposure while one or more other portions are placed elsewhere such that water exposure may result. Considering plug 154 of container 200 as a form of termite palatable bait, container 200 is illustrative of such an arrangement. Various bait compositions and pesticides may also be used in addition to those described above. Additional examples and disclosure of different sensor types, sensor communication techniques, bait material, pesticide, and pest control devices that can be used with any of bait container embodiments described herein may be found in U.S. Pat. Nos. 6,724,312; 7,212,112; and 7,212,129; and U.S. Patent Application Publication Nos. 2001/0033230 and 2001/0054962, all of which are incorporated by reference herein each in its entirety. Yet other forms of pest control device include a bait container used without a sensor at any point.

In a further embodiment, a pest control device includes a bait container including a chamber containing a bait with a termite attractant, an upper end portion defining an upper opening into the chamber, a closure to selectively access and close the upper opening with an airtight seal, and a lower end portion defining a bottom terminus of the bait container and a pocket below at least a portion of the bait to trap air to reduce intrusion of water through the lower end portion when the bait container is installed in a selected orientation.

Still a further embodiment comprises a bait container including an upper end portion opposite a lower end portion. The bait container defines a chamber containing a bait including a pesticide toxic to one or more species of termites. The lower end portion includes a pest access arrangement positioned below at least a portion of the bait and structured to permit termite access to the bait. The lower end portion defines a pocket to trap air to reduce intrusion of water through the pest access arrangement when the bait container is installed in a selected orientation.

Another embodiment is directed to a pest control system, comprising: a housing structured to be installed at least partially in ground that defines an interior space with an access opening and one or more openings to permit subterranean passage of termites into the interior space; and a bait container sized and shaped to be received in the interior space of the housing through the access opening. The bait container includes an upper end portion opposite a lower end portion and defines a chamber containing a termite bait. The lower end portion includes an air-trapping pocket below at least a portion of the bait to reduce intrusion of water through the lower end portion when installed in the housing with the lower end portion below the upper end portion.

Yet another embodiment comprises: providing a bait container including an upper end portion opposite a lower end portion and defining a chamber extending therebetween, the chamber containing a termite bait, the lower end portion defining an air-trapping pocket below at least a portion of the bait; selecting a location to install the bait container; and installing the bait container at least partially below ground at the location with the lower end portion being positioned further below ground level than the upper end portion.

A further embodiment comprises a bait container including an upper end portion opposite a lower end portion and defining a chamber extending therebetween. The chamber contains a bait attractive to termites, the lower end portion includes means for upwardly directing termite access to the bait in the chamber through the lower end portion, and the bait container includes means for trapping air to reduce water intrusion through the directing means when the bait container is installed in the ground with the lower end portion below the upper end portion and the water level in the ground reaches the directing means of the lower end portion.

Another embodiment comprises a termite sensor and a bait including an upper end portion opposite a lower end portion. The bait container includes a chamber containing a termite bait and at least a portion of the termite sensor. The lower end portion includes an air-trapping pocket below at least a portion of the bait to reduce intrusion of water through the lower end portion when installed in a selected orientation at least partially below ground.

In another embodiment, a pest control device, comprises a pest access arrangement including a plug comprised of a termite attractant material removable by termites and a fitting including an upper member defining a number of openings therethrough and one or more side walls extending downward from the upper member to receive the plug therein. The plug is disposed in the fitting below the upper member in a spaced apart relationship to define a termite gathering chamber intersecting the openings, and the one or more side walls define one or more channels bounded by a surface of the plug to route termites towards the chamber.

EXPERIMENTAL RESULTS

The following experimental results are intended to be illustrative and not limiting or otherwise restrictive as to the nature and scope of the inventions set forth herein.

FIGS. 17-20 illustrate various bar graphs showing exemplary performance comparisons of a bait container device with an air-trapping pocket design, such as containers 200, 300, 400, and 500 (hereinafter designated the "subject device") versus a standard bait tube device without such a pocket that serves as a comparative experimental control (hereinafter specifically designated the "control device"). For these experiments the new devices and control devices each contain the same pellet-type bait that includes a textured cellulose and pesticide. Each device was placed in a housing like that designated by reference numeral 170 positioned in pots of soil, collectively designated a station. Eight (8) devices of each type were used for each of two different tests. The results were averaged and are graphically depicted in FIGS. 17-20.

The first test was that of moist soil having no standing water in the stations. Tap water was added to thoroughly moisten the soil of each pot; however no excess water was in the bottom of the stations. Water was added to the pots daily as needed to retain approximate initial moisture level. The second test was that of very wet soil with a continuous one inch of standing water in the bottom of the stations. The soil was thoroughly wetted with tap water so that it ran out of the bottom of the pots. Enough water was added so that water wicked up into the pots to the point where there was 1-1.5 inches of water in the bottom of the stations. The water level was maintained at 1-1.5" in the bottom of the stations by adding water daily.

Figure 17:
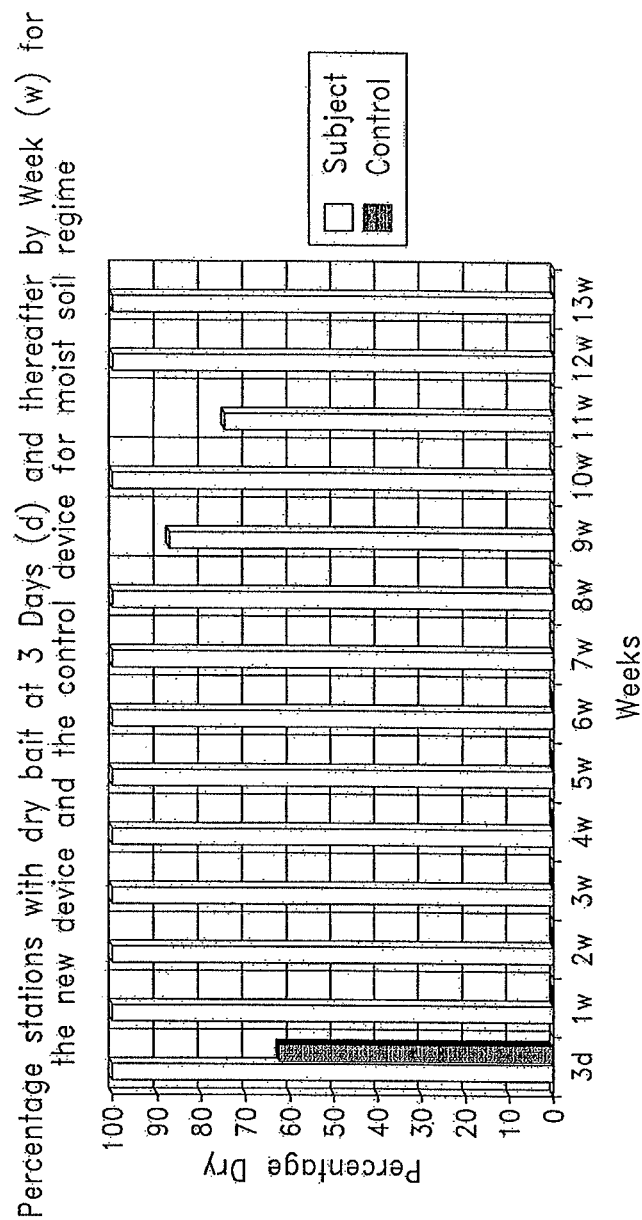
FIGS. 17-20 are illustrative bar graphs of experimental data from moisture testing.

A bar graph showing weekly percentages of bait stations dry is shown in FIG. 17 for moist soil with no standing water for an experiment of 13 weeks in duration. The first check was performed after three days (3 d) and weekly thereafter. For the stations with the subject devices, 100% were dry through 8 weeks, however one device had moisture in the bait at 9 weeks and 2 devices had moisture in the bait at 11 weeks. These subject devices were determined to be dry during subsequent weekly checks. It is speculated that dropping the subject devices back into the stations, especially those with moist/wet soil on the bottom, may be causing the moisture/mud to possibly splash up into the devices; temporarily wetting the bait. The control devices were 100% wet at one week and remained wet over the 13 weeks.

Figure 18:
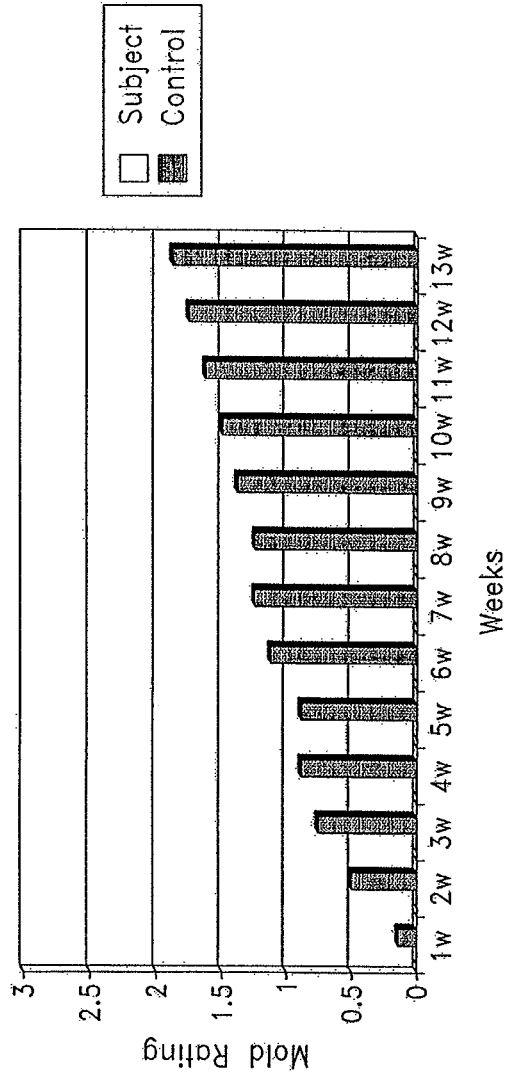

FIG. 18 illustrates a bar graph showing the weekly mold rating for the 13 week moist soil test. A mold rating was taken once per week and a scale of 0-3 was utilized. The mold scale was 0=Like new, 1=Slight mold—discoloration noted, 2=Medium, 3=Heavy mold. The mold rating was determined through visual observation of the operator. None of the bait in the subject devices had mold through 13 weeks; all mold ratings were zero (like new). For the control devices, bait mold was detected at one week and by week 13 the average mold rating was nearly=2 which equates to moderate mold growth. From weeks 4-13, the mold was significantly more in the bait of the control devices than the bait in the subject devices.

Figure 19:
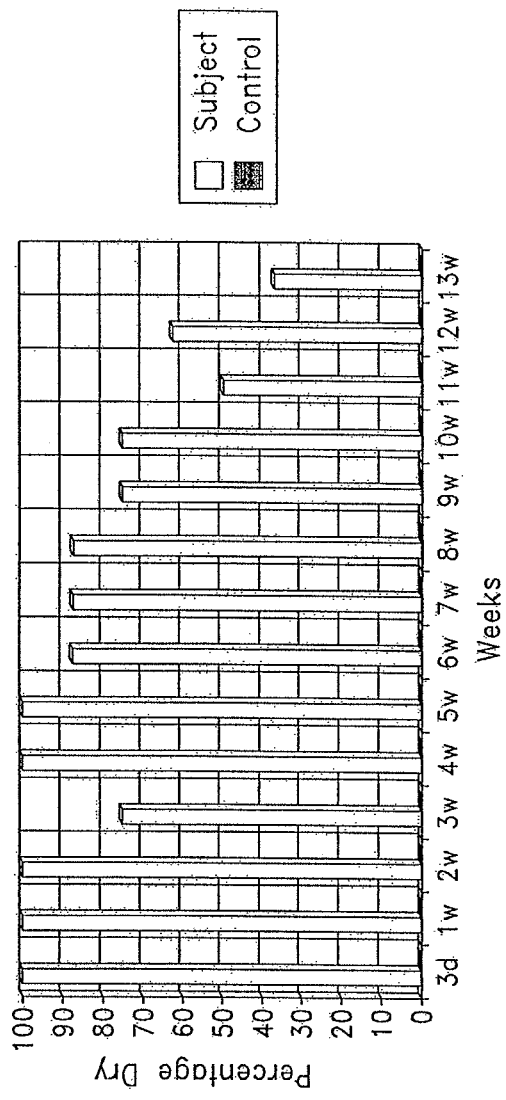

Referring now to FIG. 19, there is illustrated a bar graph showing weekly percentages of dry bait in devices in the soaked soil test over a 13 week period. The initial check was performed at day three, and weekly thereafter. For the subject devices, two had moisture at 3 weeks but were again 100% dry at four and five weeks, 87.5% dry at weeks 6-8, 62.5% dry through 9 weeks and down to 37.5% dry at 13 weeks. The control devices were 100% wet (0% dry) at 3 days which was the first check, and remained so for the balance of the period. Splash-back when dropping the subject devices into the stations after checking is speculated to be the cause of the bait of the subject devices becoming wet. An additional observation was that in four of the subject devices it appeared that the glue holding a prototype partition member failed over time (one at 9 weeks, one at 10 weeks and 2 at 12 weeks) causing it to come loose which in turn allowed to the bait to be either in or closer to the 1-1.5 inch of water in the bottom of the stations.

Figure 20:
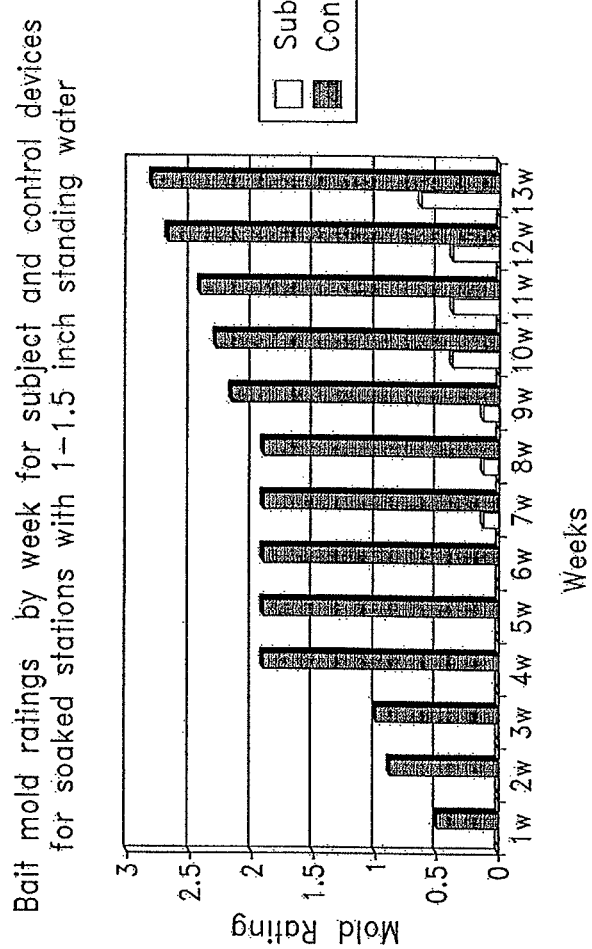

FIG. 20 illustrates a bar graph showing the weekly mold rating for the soaked soil test over the 13 week period, using the same scale and technique described in connection with FIG. 18. There was significantly more mold growth for the control device bait compared to the subject device bait for every weekly check (weeks 1-13). Mold did not appear in the subject device through 6 weeks and averaged a mold rating of approximately 0.6 at 13 weeks (1=slight mold growth). The control device bait were nearing a mean mold rating of 3 at 13 weeks (3=heavy mold growth).

Any theory, mechanism of operation, proof, or finding stated herein is meant to further enhance understanding of the present application and is not intended to make the present application in any way dependent upon such theory, mechanism of operation, proof, or finding. It should be understood that any use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A pest control device, comprising:
    an outer housing configured to be inserted into the ground,
    a bait container configured to be positioned in the outer housing, the bait container comprising (i) an upper opening defined in a first longitudinal end of the bait container, (ii) a chamber extending inwardly from the upper opening, (iii) a lower opening defined in a second longitudinal end of the bait container opposite the first longitudinal end, and (iv) a pocket extending inwardly from the lower opening to a partition that separates the chamber from the pocket, the partition having a plurality of openings defined therein,
    a cap positioned over the upper opening such that an airtight seal is formed between the cap and the bait container,
    a sensor positioned in the chamber, and
    a termite bait positioned in the chamber around the sensor.
2. The pest control device of claim 1, wherein:
    the bait container includes a cylindrical outer wall that extends from the first longitudinal end to the second longitudinal end,
    the partition is offset inwardly from the second longitudinal end, and
    the cylindrical outer wall is devoid of openings between the first longitudinal end and the partition.
3. The pest control device of claim 2, wherein:
    the pocket is defined by a cylindrical inner wall of the bait container extending inwardly from the lower opening to the partition, and
    the bait container includes a plurality of openings, extending through the cylindrical outer wall and the cylindrical inner wall between the partition and the second longitudinal end, to facilitate subterranean access of termites when the pest control device is positioned in the ground.

4. The pest control device of claim 3, wherein the cylindrical outer wall of the bait container includes an annular edge at the second longitudinal end, and each opening of the plurality of openings extends through the annular edge.

5. The pest control device of claim 2, wherein (i) the outer housing has an interior space and a plurality of passages defined therein, each of the plurality of passages being connected to the interior space such that fluid is permitted to enter the interior space, and (ii) the bait container is configured to be positioned in the interior space.

6. The pest control device of claim 1, wherein fluid communication with the termite bait positioned in the chamber is permitted only through the openings of the partition and the pocket.

7. The pest control device of claim 1, wherein a plug is positioned in the pocket, the plug being formed from a termite palatable material.

8. The pest control device of claim 7, wherein the plug is spaced apart from the partition within the pocket.

9. The pest control device of claim 7, wherein the bait container includes an upper body having the chamber defined therein, and the plug and the partition are removably coupled to the upper body.

10. The pest control device of claim 9, further comprising a fitting that includes the partition and container further includes a plurality of grooves extending along the plug, the fitting removably coupled to the upper body.

11. The pest control device of claim 1, further comprising a layer of termite palatable material positioned in the chamber, the layer of termite palatable material covering the openings defined in the partition.

12. The pest control device of claim 11, wherein the bait container includes a flange extending into the chamber, and the layer of termite palatable material is positioned between the partition and the flange.

* * * * *